3,511,662
METHOD OF PREPARING SILVER HALIDE GRAINS HAVING HIGH INTERNAL SENSITIVITY
Alain-Daniel Jouy, Vincennes, France, assignor to Eastman Kodak Company, Rochester, N.Y., a corporation of New Jersey
No Drawing. Filed Oct. 28, 1965, Ser. No. 505,461
Int. Cl. G03c 1/02
U.S. Cl. 96—94                       7 Claims

ABSTRACT OF THE DISCLOSURE

Silver halide grains which have high internal sensitivity are prepared by reacting a water-soluble silver salt with a water-soluble inorganic halide in a medium containing approximately 170 to 200 grams of ammonia per liter of the reaction system to form a silver halide-ammonia complex which upon reduction of the ammonia content to a value below approximately 85 grams per liter decomposes to yield silver halide grains having high internal sensitivity. The silver halide grains thus formed are useful for preparing photographic emulsions which may be used, for example, in reversal processes or direct X-ray emulsions. The internalizing of the silver halide grains can be furthered by placing them in a bath rich in potassium iodide.

---

This invention relates to a method of preparing silver halide photographic emulsions having a high internal sensitivity involving the preparation of a silver halide-ammonia complex followed by decomposing of this complex whereby internalization of sensitivity of the grains of silver halide is obtained.

In the making of silver halide dispersions ordinarily an aqueous solution of silver nitrate is mixed with an aqueous solution of an alkali metal halide in the presence of a peptizer such as gelatin. The resulting silver halide dispersion is useful in preparing photographic emulsions, in which chemical sensitizers, antifoggants, aqueous gelatin, and the like may be added and ripening operations or other types of treatment to impart certain characteristics to the emulsion might be used.

One object of my invention is to provide a method of preparing silver halide grains or crystals and photographic emulsions made therefrom in which the silver halide grains have high internal sensitivity. Another object of my invention is to provide silver halide grains useful for preparing photographic emulsions which may be used in reversal processes. Other objects of my invention will appear herein.

Whereas silver halide crystals have been previously prepared in ammonia-free solutions or in solutions containing but a small amount of ammonia, I have found that when the silver halide is prepared in a system having a markedly high concentration of ammonia the silver halide forms as a complex with the ammonia and upon suddenly lowering the ammonia concentration of the medium, the crystals of the complex are decomposed with the loss of ammonia resulting in silver halide crystals having high internal sensitivity. I have found that this formation of a complex of silver halide and ammonia occurs when the ammonia concentration in the system in which the silver halide formation takes place is on the order of 170 to 200 grams of ammonia per liter. It is desirable to have a peptizer such as gelatin or some other recognized peptizing material present in this system. The optimum concentration of ammonia for use in my invention is about 180 grams per liter.

After the crystals of the silver halide ammonia complex have formed, the ammonia content of the medium is almost immediately lowered such as to below 85 grams per liter or preferably below 50 grams for instance, by dilution with water. Alternatively, reduction of ammonia concentration can be attained by neutralizing the ammonia with acid or by elevating the temperature of the mass. The most favorable temperature for operation of the process seems to be at about 15° C. A sudden partial neutralization of the ammonia with acid, as for instance, sulfuric acid diluted with a large volume of water destroys the solvent power of the ammonia and leads to decomposition of the complex. The rapidity of the decomposition of the silver halide ammonia complex and the effect of the solvent power of the medium used greatly affect the size of the crystals obtained. For instance if the ammonia evaporation is quite high the decomposition of the complex may take place in a medium leading to silver halide crystals of very large size.

Another factor which can be used in furthering the internalizing of the sensitivity of the silver halide crystals is the placing of the crystals in a bath rich in potassium iodide. As a matter of fact, the iodide medium may be so effective for internalizing the silver halide crystals as to result in direct positive emulsions. In the preparation of the silver halide ammonia complex it might be desirable in some cases to supply polyvinyl alcohol or polyvinyl pyrrolidone to the mixture in which the reaction is carried out thus permitting preparation of the silver halide at a lower temperature. The emulsions prepared in accordance with my invention in which the grains have high internal sensitivity may be useful in the preparation of reversal direct positive emulsions or direct X-ray emulsions. In some cases the preparation of printout emulsions is convenient particularly where the internalizing of the sensitivity of the silver halide grains has not been carried to the point that the surface sensitivity is relatively minor.

The following examples illustrate my invention:

EXAMPLE 1

169 parts of silver nitrate were dissolved in 400 parts of 20% ammonia. 125 parts of potassium bromide and 13 parts of gelatin were dissolved in 875 parts of 20% ammonia plus 35 parts of distilled water at 40° C. The ammonical silver nitrate was poured rapidly with agitation into the container containing the solution of potassium bromide in ammonia causing the precipitation of a $AgBr-NH_3$ complex. As the mass was withdrawn from the containing vessel, 2600 parts of distilled water having a temperature of 40° C. was rapidly mixed into the complex whereby the ammonia concentration was reduced to 42 grams per liter. The silver bromide ammonia complex was thereby destroyed forming silver bromide crystals. There was then added a solution of 4.4 parts of potassium bromide and 1.3 parts of potassium iodide in 300 parts of distilled water; following which, the ammonia was neutralized with dilute aqueous sulfuric acid and a solution of 13 parts of gelatin in 115 parts of distilled water was added. The resulting silver halide crystal-containing protective colloid was washed by noodling the mass and washing with cold water. The washed material was redispersed by mixing with an aqueous solution of gelatin and formed into a photographic emulsion, the silver halide grains of which had high internal sensitivity characteristics.

EXAMPLE 2

160 parts of silver nitrate were dissolved in 400 parts of ammonia of 20% concentration. In another vessel a mixture was prepared of 125 parts potassium bromide, 875 parts of ammonia of 20% strength, 13 parts of gelatin and 35 parts of distilled water. The ammoniacal silver nitrate was led into the vessel containing the solution of potassium bromide in ammonia during 5 minutes and with rapid stirring. A silver bromide ammonia complex precipitated. There was then mixed with the mass 2600 parts of distilled water whereby the complex was destroyed giving silver bromide grains. The precipitate-containing mass was allowed to stand for 10 minutes whereupon there was added a solution of 4.4 parts of potassium bromide and 1.3 parts of potassium iodide in 300 parts of distilled water. Following this there was added a solution of 13 parts of gelatin and 115 parts of distilled water and the resulting emulsion obtained was washed in the conventional manner, redispersed in aqueous gelatin, supplied with sensitizer and finished in the usual manner. An emulsion was obtained, the grains of which had high internal sensitivity.

EXAMPLE 3

A solution of 169 parts of silver nitrate was prepared in 400 parts of ammonia of 20% concentration. Also prepared was a solution of a mixture of 125 parts of potassium bromide, 0.85 part of polyvinyl pyrrolidone in 875 parts of 20% ammonia. The silver nitrate solution was rapidly stirred into the vessel containing the solution of potassium bromide in ammonia and a precipitate resulted as in the preceding example. The procedure was continued as in the preceding example and there resulted a silver halide photographic emulsion, the grains of which exhibited high internal sensitivity.

EXAMPLE 4

The preceding example was repeated except that instead of polyvinyl pyrrolidone in the potassium bromide solution, 13 parts of gelatin, 1 part of acrylonitrile-acrylic acid copolymer and 33 parts of distilled water were used. The procedure described in the preceding example was repeated. The acrylonitrile-acrylic acid copolymer acted as a halogen-accepting high polymer. The emulsion obtained had excellent printout speed.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A process for the preparation of silver halide grains which have high internal sensitivity, which comprises reacting a water-soluble silver salt with a water-soluble inorganic halide in a peptizer containing approximately 170–200 grams of ammonia per liter of the reaction system to form a silver halide-ammonia complex followed by drastic reduction of the content of ammonia to a value below approximately 85 grams per liter to decompose the silver halide-ammonia complex and form silver halide grains having high internal sensitivity.

2. A process in accordance with claim 1 in which the ammonia content is reduced by rapid dilution with water.

3. A process in accordance with claim 1 wherein the ammonia content is reduced by partial neutralization with acid.

4. A process in accordance with claim 1 wherein the ammonia content is reduced by driving off part of the ammonia with heat.

5. A process for the preparation of high internal sensitivity silver halide grains which comprises reacting a water-soluble silver salt with a water-soluble inorganic halide in a gelatin peptizer containing approximately 170–200 grams of ammonia per liter of the reaction system to form a silver halide-ammonia complex followed by drastically reducing the ammonia content to a value below approximately 85 grams per liter to decompose the silver halide-ammonia complex and form silver halide grains having high internal sensitivity.

6. A process for preparing high internal sensitivity silver halide grains which comprises reacting a water-soluble silver salt with a water-soluble inorganic halide in a peptizer containing approximately 170–200 grams of ammonia per liter of the reaction system to form a silver halide-ammonia complex followed by drastically reducing the ammonia content below approximately 85 grams per liter to decompose the silver halide-ammonia complex and form silver halide grains having high internal sensitivity and subsequently placing the silver halide grains in a bath rich in potassium iodide.

7. A process for preparing high internal sensitivity silver halide grains which comprises reacting a water-soluble silver salt with a water-soluble inorganic halide in a peptizer containing therein polyvinyl alcohol or polyvinyl pyrrolidone or both and approximately 170–200 grams of ammonia per liter of the reaction system to form a silver halide-ammonia complex and subsequently reducing the ammonia content to a value below approximately 85 grams per liter to decompose the silver halide-ammonia complex and form silver halide grains having high internal sensitivity.

References Cited

UNITED STATES PATENTS

| 2,146,938 | 2/39 | Claus | 96—94 |
| 2,646,353 | 7/53 | Hill et al. | 96—94 |
| 2,646,426 | 7/53 | Damschroder | 96—94 |
| 2,678,883 | 5/54 | Jones et al. | 96—94 |
| 3,000,741 | 9/61 | De Pauw et al. | 96—94 |
| 3,123,474 | 3/64 | Byrne | 96—94 |

OTHER REFERENCES

Zelikman et al.: Making and Coating Photographic Emulsions, pp. 17–19, 84–86, 116–118 and 205–207, The Focal Press, New York (1964).

J. TRAVIS BROWN, Primary Examiner

U.S. Cl. X.R.
96—64, 108, 114